United States Patent [19]

Sander

[11] Patent Number: 5,576,603
[45] Date of Patent: Nov. 19, 1996

[54] AUTOMATIC DISTRIBUTION DEVICE FOR TELECOMMUNICATION AND DATA LINES

[75] Inventor: Claus Sander, Berlin, Germany

[73] Assignee: Krone Aktiengesellschaft, Berlin-Zehlendorf, Germany

[21] Appl. No.: 470,069

[22] Filed: Jun. 6, 1995

[30] Foreign Application Priority Data

Jun. 16, 1994 [DE] Germany .................. 44 20 806.5

[51] Int. Cl.⁶ ................ H02B 1/01; H04Q 1/14
[52] U.S. Cl. .................. 318/3; 200/175; 361/827; 361/828; 379/227; 379/326; 379/328
[58] Field of Search ............. 318/3, 4, 5; 200/175, 200/176, 178, 179; 340/825.79; 361/822, 823, 826, 827, 828, 829, 832; 379/156, 165, 219, 225, 226, 227, 325, 326, 327, 328, 329, 330, 291

[56] References Cited

U.S. PATENT DOCUMENTS 4,406,510 9/1983 Debortoli et al. .
4,603,377 7/1986 Kobayashi et al. ............ 361/832
4,709,463 12/1987 Cristescu et al. .
4,817,134 3/1989 Pickens et al. ............... 379/291
4,829,564 5/1989 Jarvis ......................... 379/327

OTHER PUBLICATIONS

Tominaga et al. Automated MDF System for Switching System Fujitsu Sci. Tech. J., 28, Sep. 1992, pp. 422–438.

Primary Examiner—Bentsu Ro
Attorney, Agent, or Firm—McGlew and Tuttle

[57] ABSTRACT

An automatic distribution device for telecommunication and datalines, comprising connection terminals for exchange and subscriber cables and comprising a remotely controllable connection device with a grip element. In order to automate a distribution device provided with terminal blocks, the connection terminals are disposed in terminal blocks oriented radially to a central axis, the connection device is pivotably supported in the central axis and the grip element can radially be swung out from the connection device.

8 Claims, 4 Drawing Sheets

1

AUTOMATIC DISTRIBUTION DEVICE FOR TELECOMMUNICATION AND DATA LINES

FIELD OF THE INVENTION

The present invention relates to an automatic distribution device for telecommunication and data lines, comprising connection terminals for exchange and subscriber cables and comprising a remotely controllable connection device with a grip element.

BACKGROUND OF THE INVENTION

An automatic distribution device of the type referred to hereinbefore is known in the art from the magazine Fujitsu Sci. Tech. J., 28, 3 Sep. 1992, pages 422 to 438. The prior art automatic distribution device comprises between the connection terminals for the exchange and subscriber cables a matrix of a printed circuit board with intersection holes, a plurality of miniaturized contact pins and a high-precision robot as a connection device, in order to place the contact pins in the matrix holes or to remove them therefrom. By means of the prior art automatic distribution device an automatic, remotely controllable connection without jumper cables is possible.

However, the prior art remotely controllable connection device cannot be used with conventional distribution devices which are provided with connection terminals disposed in terminal blocks and requiring jumper cables connected in the conventional manner. This is because the remotely controllable connection device would come collide with the jumper cables during a movement along the terminal blocks provided with the jumper cables.

SUMMARY AND OBJECTIVES OF THE INVENTION

It is therefore the object of the invention to automate a distribution device provided with terminal blocks by means of a remotely controllable connection device and to remotely wire while avoiding jumper cables.

According to the invention, the connection terminals are disposed in terminal blocks oriented radially to a central axis. The connection device is pivotably supported in the central axis and the grip element at the connection device can radially be swung out. The subscriber cables are firmly connected with the connection terminals of the terminal blocks and the exchange cables are conically fanned out from the end of the central axis with a bundle connected by means of the grip element of the connection device with the connection terminals of the terminal blocks. The grip element can be swung in a simple manner between the terminal blocks positioned in a raywise manner around the central axis and the grip element can be rotated in a swung-in condition about the central axis, without collisions with the connected exchange cables taking place.

The terminal blocks are formed in particular as secants to a fictitious spherical segment or are circularly curved in the fictitious spherical segment the center of which is located in the central axis. In the latter case, the conically fanned out exchange cables have all the same lengths and can thus be connected by means of the grip element in any desired position at a connection terminal existing in a terminal block. For this purpose, the terminal blocks have plug elements for receiving plugs provided at the end of the exchange cables.

For temporarily or permanently fixing not needed exchange cables, in addition to the terminal blocks disposed on a partial portion of the fictitious spherical segment and provided with insulation displacement contact elements for the connection with the subscriber cables, deposit blocks provided only with plug elements are disposed on another partial portion of the spherical segment.

Further advantageous embodiments of the invention relate to the form of the connection device and of the housing enclosing the automatic distribution device. The housing is formed of a downwardly open bell-shaped top enclosing the terminal and deposit blocks disposed in the fictitious spherical segment and of a conical housing underneath the bell-shaped top receiving the connection device downwardly oriented with its free end. The thus configured automatic distribution device can be disposed above ground by means of a wall support or a column as well as under ground. The automatic distribution device in the underground version of the bell-shaped top includes a housing which is capable to be made flood resistant based on the Caisson principle.

In the following, the invention will be described in more detail, with reference to a preferred embodiment of an automatic distribution device represented in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1:
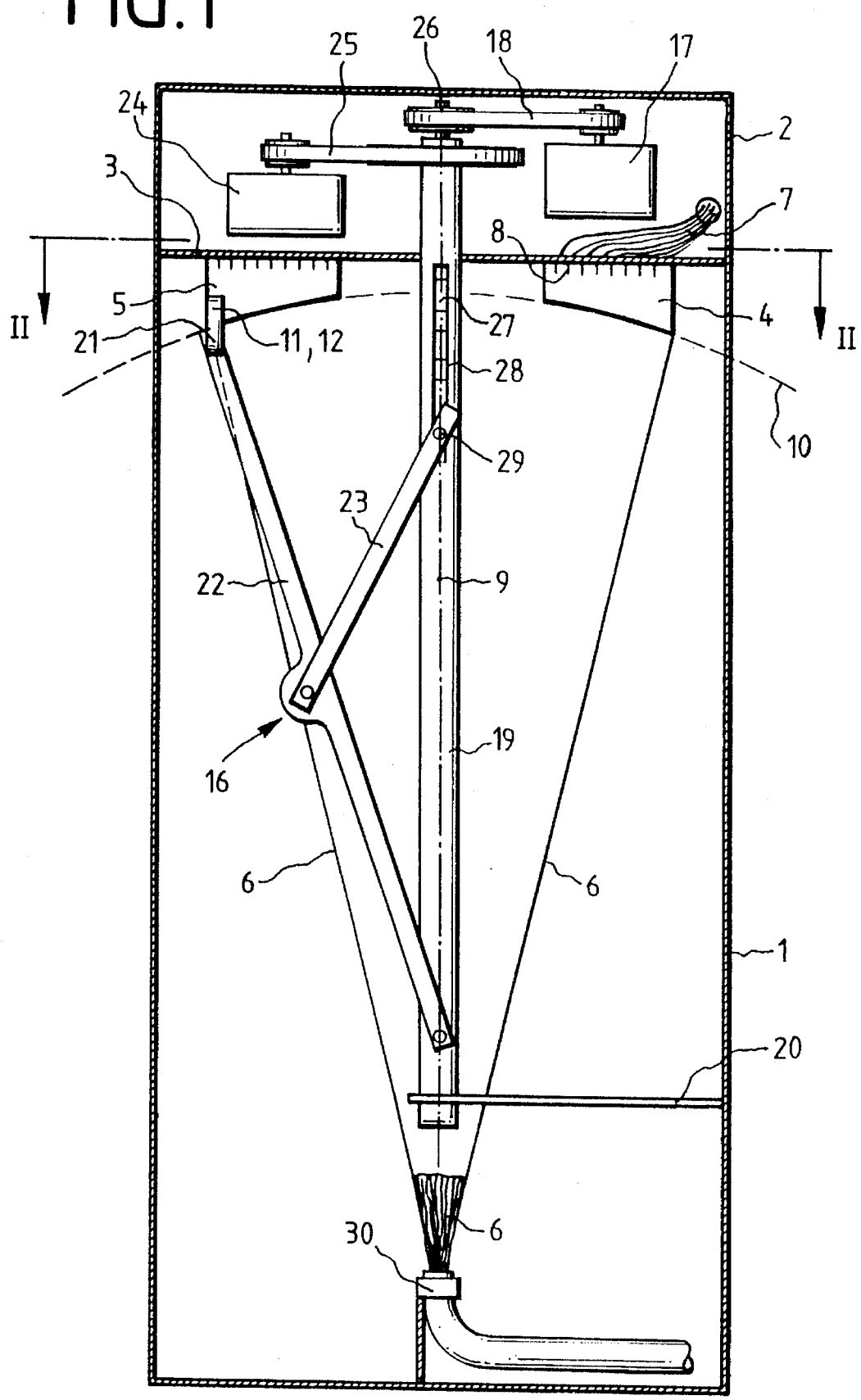
FIG. 1 is a schematic vertical sectional view of the device.
Figure 2:
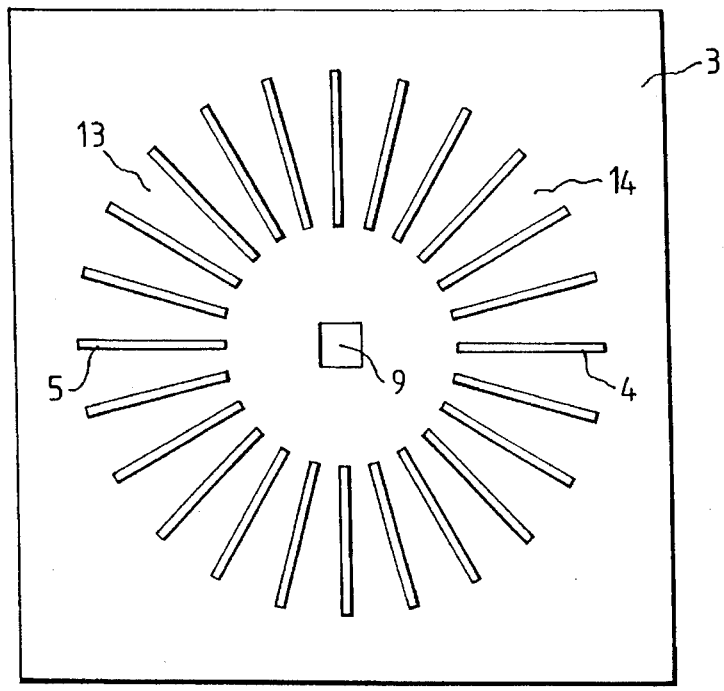
FIG. 2 is a sectional view according to line II—II in FIG. 1.
Figure 3:
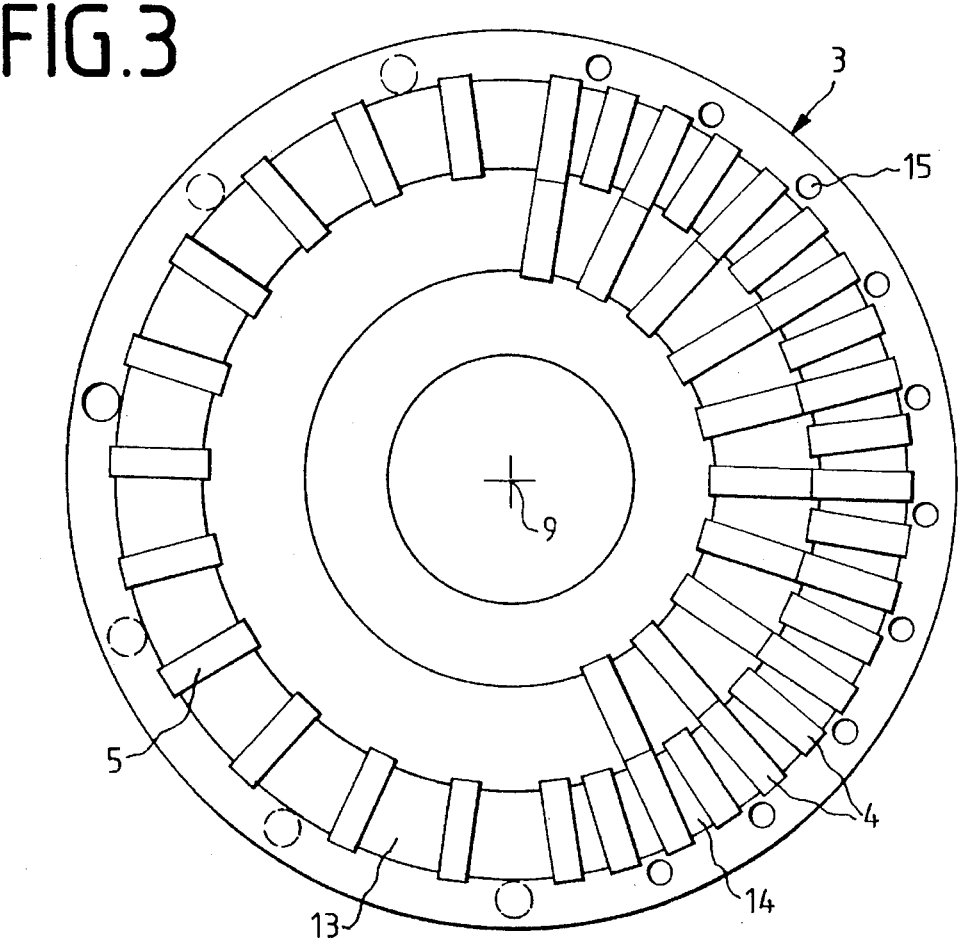
FIG. 3 is a the top view of an intermediate bottom receiving the terminal and deposit blocks.
Figure 4:
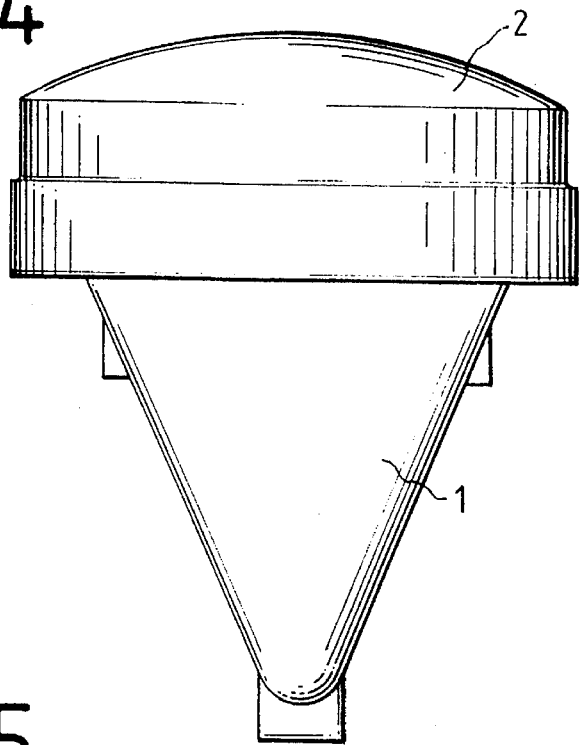
FIG. 4 is a front view the view of the distribution device closed by the bell-shaped top and the conical housing.
Figure 5:
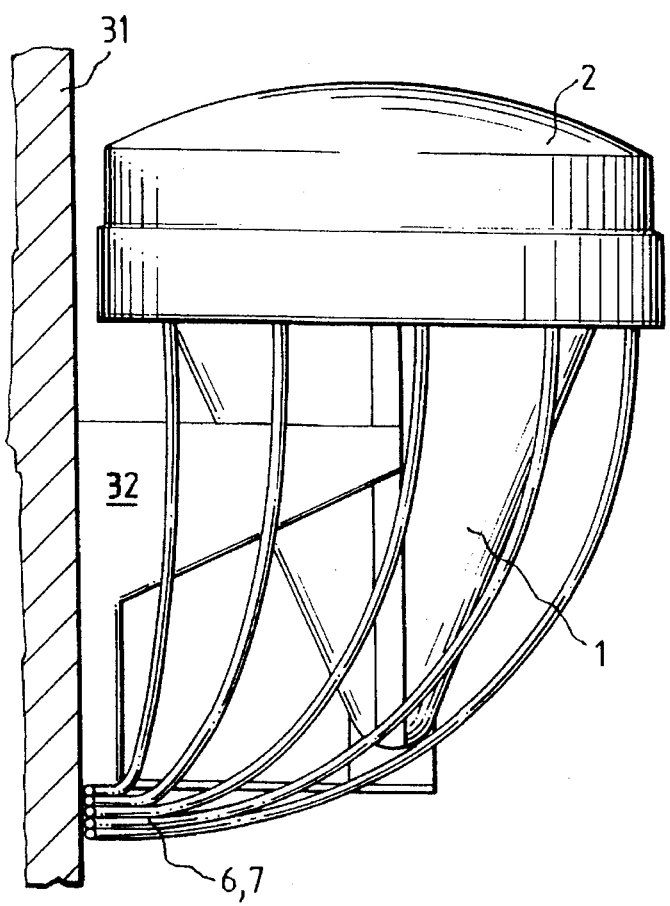
FIG. 5 is a side view of the distribution device according to FIG. 4 as a wall mounted device.

Referring to the drawings in particular, the automatic distribution device for telecommunication and data lines according to the invention comprises a housing 1. The housing 1 is rectangular in FIG. 1 and is conical in FIGS. 3–5. FIGS. 3–5 show a other embodiments of the invention. The device includes a bell-shaped top 2. Both the housing and top are formed of plastic or aluminium. A plurality of terminal and deposit blocks 4, 5 are provided in the housing 1, underneath the bell-shaped top 2 at an intermediate bottom 3. The terminal blocks 4 are provided with connection terminals for exchange and subscriber cables 6 and 7, respectively. The subscriber cables 7 are connected underneath the bell-shaped top 2 to insulation displacement contact elements 8 of the terminal blocks forming connection terminals. As is shown in FIGS. 2 and 3, the terminal blocks 4 provided with the connection terminals, e.g. in the form of insulation displacement contact elements 8, are disposed radially or in a ray-wise manner to the central axis 9 of the distribution device. Further, the terminal blocks 4 and also the deposit blocks 5 are, as is shown in FIG. 1, circularly shaped at least at one side and are thus disposed in a fictitious spherical segment 10. The center of fictitious spherical segment 10 is located in the central axis 9. Alternatively, the terminal blocks and deposit blocks 4 and 5, respectively can also be disposed as tangents or secants to the fictitious spherical segment 10, the vertical line to the top side of the oriented terminal and deposit blocks 4, 5 passing through the center of the fictitious spherical segment 10 located in the central axis 9.

The terminal blocks 4 as well as the deposit blocks 5 are provided with plug elements for receiving plugs 12 attached at the ends of the exchange cables 6.

As is shown in FIGS. 2 and 3, terminal blocks 4 provided with insulation displacement contact elements 8 for the connection with the subscriber cables 7 are disposed on a partial portion of the fictitious spherical segment 10 and deposit blocks 5 only provided with the plug elements 11 are disposed on another partial portion of the spherical segment 10. The density of the terminal blocks 4 shown on the right-hand side of FIG. 3 is larger than the density of the deposit blocks 5 shown on the left-hand side of FIG. 3. It is essential that between the deposit blocks 5 oriented in a ray-wise manner as well as between the terminal blocks 4 also oriented in ray-wise manner, radial free spaces 13, 14 are left, the purpose of which will be described further below. The embodiment of the intermediate bottom 3 shown in FIG. 3 further comprises at its outer periphery a number of through-openings 15 serving for cable passage.

Within the housing 1, which is conical in the embodiment of FIGS. 3–5, there is disposed a connection device 16 formed of an axis of rotation 19 supported in the central axis 9 and driven by an electric motor 17 and a belt drive 18. The axis of rotation is supported in the intermediate bottom 3 and in a bearing arm 20. A swingarm 22 is pivotably supported at the free end of the axis of rotation 19 and carries at its free end a grip element 21 and a jib arm 23. The jib arm 23 approximately centrally engages the swing arm 22. The other end of the jib arm 23 is supported at a vertical drive 26 carried in the axis of rotation 19 and driven by means of an electric motor 24 and a belt drive 25. The vertical drive 26 is formed of a spindle 27 rotatably supported in the axis of rotation 19 and driven by the motor 24 over the belt drive 25 and of a spindle nut 29 rotatable there-on and guided in a vertical groove 28 of the axis of rotation 19. The spindle nut is attached at the end of the jib arm 23. By a rotary movement of the spindle 27 initiated by the electric motor 24 over the belt drive 25, the spindle nut 29 is moved up and down in the vertical groove 28 of the axis of rotation 19. The jib arm 23 is activated and the swing arm 22 is swung outwardly and inwardly. Thereby, the grip element 21 pivotably supported at the free end of the swing arm 22 can be swung outwardly and inwardly in parallel to the terminal and deposit blocks 4, 5 disposed in a star-type manner and between those. With an inwardly swung grip element 21, the axis of rotation 19 can be rotated under the action of the electric motor 19, in order to swing the grip element 21 into another one of the free spaces 13, 14 between the terminal and deposit blocks 4, 5.

The described distribution device operates as follows:

To the insulation displacement contact elements 8 of the terminal blocks 4 accessible from the top side of the intermediate bottom 3 are first connected to the subscriber cables 7. The exchange cables 6 are still bundled in a cable support 30 underneath the lower end of the axis of rotation 19 and then made free are all cut to the same lengths and provided with plugs 12 at their free ends. The plugs are inserted in the plug elements 11 of the deposit blocks 5. The thus prepared distribution device can now be connected by a remote control from a not shown center as well as rearranged even without using additional jumper lines. For this purpose, only the electric motors 17, 24 and the grip element 21 need be operated, those members being connected in a not shown manner to the remote control. For establishing a line connection between an exchangeable 6 and a subscriber cable 7, the plug 12 of an exchange cable 6 assigned to a particular subscriber cable 7 is seized by the grip element 21 and moved by the swing and rotational movement thereof to the plug element 11 of the respective subscriber cable 7 and inserted there, whereupon the grip element 21 is loosened and used for another connection process. In a corresponding manner, a rearrangement of an existing line is performed by that the respective plug 12 of a subscriber cable 7 is pulled out from the respective plug element 11 by means of the grip element 21 moving thereto and is supplied to the plug element 11 of the new subscriber cable 7 by swinging and moving the grip element 21. In this way, connection and rearrangement of the automatic distribution device are performed in the same manner, for rearrangement a jumper wire not being required. The provision that all of the exchange cables 6 are of the same length, calculated from the cable support 30, allow for each plug 12 of each exchange cable 6 to be supplied to any of the plug elements 11 of a subscriber cable. Since thus all exchange cables 6 are tensioned relatively tightly within the housing 1, the swing arm 22 together with the grip element 21 can freely be moved or swung in the free spaces 13, 14 between the terminal and deposit blocks 4,5.

The automatic distribution device is not only suitable for copper cables, but also for light-waveguides because of the clear and large bending radii.

Figure 6:
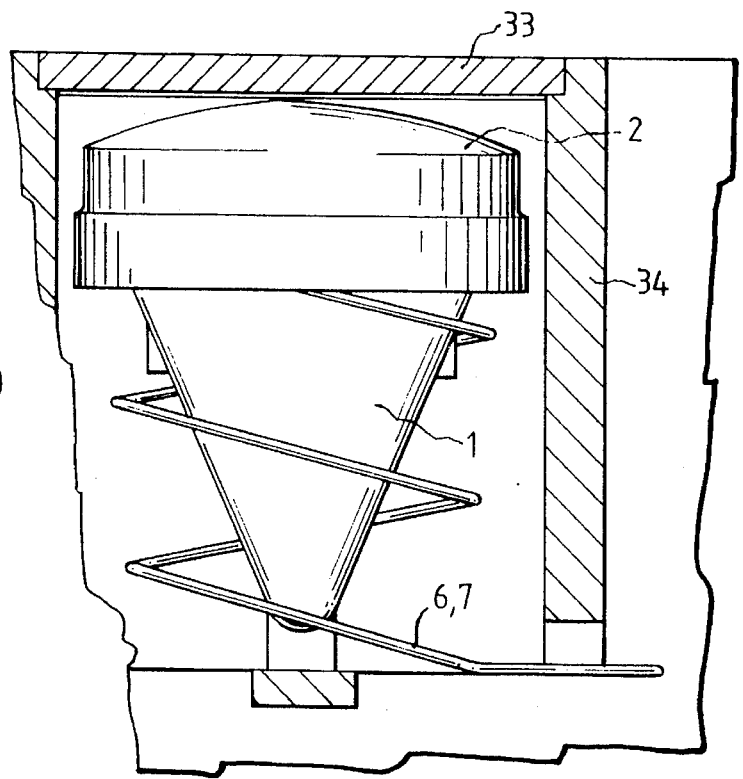
FIG. 6 is a front view of the distribution device according to FIG. 4 as an underground device in operating condition.
Figure 7:
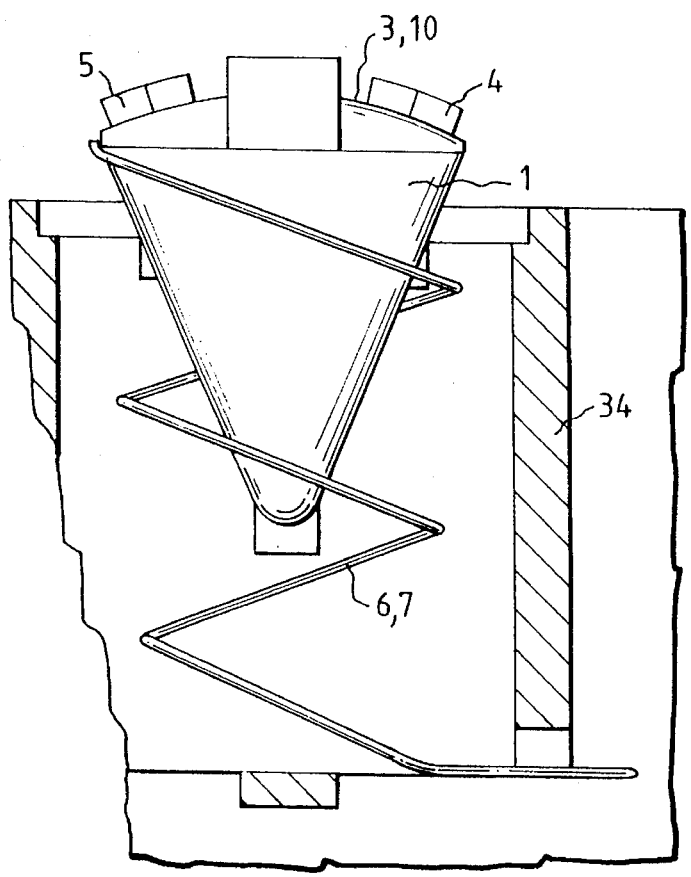
FIG. 7 is a front view of the distribution device according to FIG. 6 in mounting condition.

In FIGS. 4 to 7 specific embodiments are shown of the conical housing 1 and the bell-shaped top 2 disposed thereabove. The automatic distribution device can thus be supported according to FIG. 5 at a wall 31 by means of a collar arm 32. The exchange and subscriber cables 6, 7 are introduced from below into the bell-shaped top 2 and are attached therein or at the bottom-side end of the conical housing 1. FIGS. 6 and 7 show the particularly preferred embodiment of the automatic distribution device in an under ground application, the automatic distribution device with the conical housing 1 and the bell-shaped top 2 being supported within a shaft 34 to be closed by a cover 33. The cables are supplied to the bell-shaped top 2 in a helical manner from below outside the conical housing 1. By this underground configuration the housing 1 with the bell-shaped top 2 operates on the Caisson principle and can be installed in a watertight manner, water possibly entering the shaft 34 will not enter the bell-shaped top 2, since an air cushion protecting the line connections will be formed.

After removing the cover 33 from the shaft 34, the automatic distribution device can be taken out by a lifting device according to FIG. 7, and can be connected in the area of the subscriber cables 7 after removing the bell-shaped top 2. The exchange cables 6 are only accessible after removing the conical housing 1, and for this purpose the latter can be configured as a two-part unit.

While specific embodiments of the invention have been shown and described in detail to illustrate the application of the principles of the invention, it will be understood that the invention may be embodied otherwise without departing from such principles.

What is claimed is:

1. An automatic distribution device for telecommunication and data lines, comprising:

connection terminals for exchange and subscriber cables, said connection terminals being disposed in terminal blocks, said terminal blocks being oriented radially with respect to a central axis;

connection means including a connection device with a grip element, said connection means being controllable remotely, said connection device being pivotably supported along said central axis, said grip element being movable radially to be swung out from the connection device.

2. An automatic distribution device according to claim 1, wherein said terminal blocks are formed as secants positioned relative to an imaginary spherical segment, center of said spherical segment being located at said central axis.

3. An automatic distribution device according to claim 1, wherein said terminal blocks are circularly curved and disposed as imaginary spherical segments with a center located outside said central axis.

4. An automatic distribution device according to claim 1, wherein said terminal blocks include plug elements for receiving plugs provided at an end of exchange cables.

5. An automatic distribution device according to claim 4, wherein said terminal blocks are disposed on a partial portion of an imaginary spherical segment, said terminal blocks being provided with insulation displacement contact elements for connection with subscriber cables, and deposit blocks are provided with plug elements, said deposit blocks being disposed on another partial portion of said imaginary spherical segment.

6. An automatic distribution device according to claim 1, wherein said connection device includes:

a rotatably-driven axis of rotation element supported at said central axis;

an electric motor for driving said rotatably-driven axis of rotation element;

a swing arm pivotably supported by said rotatably-driven axis of rotation element and having a free end carrying said grip element;

a jib arm approximately centrally engaging said swing arm, said jib arm having another end supported at a motor-driven vertical drive carried by said rotatably-driven axis of rotation element.

7. An automatic distribution device according to claim 6, wherein said motor-driven vertical drive includes a motor-driven spindle rotatably supported in said driven axis of rotation element and a spindle not rotatable thereon and guided in a vertical groove of said driven axis of rotation element, said spindle not being attached at an end of said jib arm.

8. An automatic distribution device according to claim 6, wherein said axis of rotation element extends vertically downwardly, said connection device including a conical housing enclosing said connection device, said terminals and deposit blocks being disposed in a spherical segment enclosed by a downwardly bell-shaped top, said top being connected to said conical housing.

* * * * *